United States Patent
Bird et al.

(10) Patent No.: US 11,306,605 B2
(45) Date of Patent: Apr. 19, 2022

(54) AUTOMATED REHEAT STOP VALVE SEAT RESTORATION

(71) Applicant: SIEMENS ENERGY, INC., Orlando, FL (US)

(72) Inventors: Derek A. Bird, Oviedo, FL (US); Jason Rock, Orlando, FL (US); Timothy E. Mazzotta, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 369 days.

(21) Appl. No.: 15/581,486

(22) Filed: Apr. 28, 2017

(65) Prior Publication Data

US 2018/0313223 A1    Nov. 1, 2018

(51) Int. Cl.
| | |
|---|---|
| *B23Q 9/02* | (2006.01) |
| *F01D 17/10* | (2006.01) |
| *B23Q 9/00* | (2006.01) |
| *B23P 6/00* | (2006.01) |
| *G05B 19/408* | (2006.01) |
| *F16K 1/20* | (2006.01) |

(52) U.S. Cl.
CPC .............. *F01D 17/10* (2013.01); *B23P 6/002* (2013.01); *B23Q 9/0057* (2013.01); *G05B 19/4083* (2013.01); *B23P 6/00* (2013.01); *F05D 2230/10* (2013.01); *F16K 1/2014* (2013.01); *G05B 2219/32228* (2013.01)

(58) Field of Classification Search
CPC .... B23B 1/00; B23B 5/06; B23B 5/08; B23B 29/034; B23B 29/03432; B23B 29/03439; B23B 29/035; B23B 29/03471; B23B 29/03482; B23B 29/03492; B23B 2215/76; B23B 2229/16; Y10T 82/12; Y10T 82/125; Y10T 82/128; Y10T 82/22; Y10T 82/2512
See application file for complete search history.

(56) References Cited

U.S. PATENT DOCUMENTS 1,186,403 A * 6/1916 Johnsen ................... B23B 47/28
  408/111
1,286,515 A * 12/1918 Boman ................. B23B 51/107
  408/200

(Continued)

FOREIGN PATENT DOCUMENTS

JP    5881884 B1 * 3/2016 ............. B23B 41/12

*Primary Examiner* — Alan Snyder (57) ABSTRACT

An automated method for restoring an end surface of a cylindrical component of a turbine engine by cutting a profile into the end surface is provided. A base of a cutting device is installed against an inner diameter of the cylindrical component. The base is the aligned to the end surface. A cutting head of the cutting device is positioned to a desired position to enable the cutting. A motor of the cutting device is activated to rotate the cutting head about a central axis of the cylindrical component to cut the end surface of the cylindrical component. A profile of the end surface is created by the cutting of the end surface via the motor. Upon activation of the motor, the cutting device is guided along a circumferential direction against the end surface. A system for cutting a profile into a surface of a cylindrical component is also provided.

9 Claims, 5 Drawing Sheets

(56) References Cited

U.S. PATENT DOCUMENTS

| | | | | |
|---|---|---|---|---|
| 1,463,089 A * | 7/1923 | Martyn | B23Q 9/00 | 408/111 |
| 1,837,390 A * | 12/1931 | Albertson | B23Q 9/00 | 408/111 |
| 2,152,954 A * | 4/1939 | Campbell | B23Q 9/00 | 408/78 |
| 2,461,490 A * | 2/1949 | Berkman | B23Q 9/00 | 408/81 |
| 3,881,396 A * | 5/1975 | Case | B23C 3/056 | 408/80 |
| 3,981,210 A * | 9/1976 | Janiszewski | B23B 29/027 | 82/1.4 |
| 4,050,836 A * | 9/1977 | Anders | B23B 29/03446 | 29/560 |
| 4,175,471 A * | 11/1979 | Wilger | B23B 3/26 | 173/145 |
| 4,250,775 A * | 2/1981 | Jerue | B23B 29/03446 | 82/1.11 |
| 4,678,379 A * | 7/1987 | Sunday | B23Q 9/0021 | 408/83.5 |
| 4,758,121 A * | 7/1988 | Kwech | B23B 29/02 | 408/104 |
| 4,813,828 A * | 3/1989 | Beck | B23B 51/0036 | 409/132 |
| 4,824,296 A * | 4/1989 | Strait | B23B 29/02 | 408/80 |
| 4,842,452 A * | 6/1989 | Strait | B23B 29/02 | 408/16 |
| 4,913,601 A * | 4/1990 | Tenand | B23C 3/055 | 408/143 |
| 5,030,046 A * | 7/1991 | Ricci | B23C 3/051 | 408/75 |
| 5,183,365 A * | 2/1993 | Silk | B23B 3/265 | 408/181 |
| 2007/0258783 A1* | 11/2007 | Bartlein | B23D 5/02 | 409/244 |
| 2009/0297286 A1* | 12/2009 | Kamphuis | B23B 41/12 | 408/1 R |
| 2010/0145496 A1* | 6/2010 | Tang | B23Q 17/00 | 700/174 |
| 2010/0269327 A1* | 10/2010 | Gray | B23Q 39/027 | 29/592 |
| 2010/0316458 A1* | 12/2010 | Lindgren | G05B 19/402 | 409/79 |
| 2012/0291282 A1* | 11/2012 | Sperring | B23B 3/24 | 29/890.121 |
| 2014/0260841 A1* | 9/2014 | Honegger | G05B 19/18 | 82/157 |
| 2017/0182623 A1* | 6/2017 | Sugitani | B23B 41/12 | |

* cited by examiner

AUTOMATED REHEAT STOP VALVE SEAT RESTORATION

BACKGROUND

1. Field

The present disclosure relates generally to an automated method to restore an end surface of a turbine component, and more particularly, to an automated method to cut a profile into a seating surface of a reheat stop valve.

2. Description of the Related Art

A conventional steam turbine includes a higher pressure turbine and at least one lower pressure turbine coupled to a single shaft. Steam enters the turbine at the high pressure turbine through a reheat stop valve and a control valve. The thermal energy of the steam is converted to mechanical energy in the higher pressure turbine, and the steam is exhausted to reheaters. In each reheater, the steam is dried, reheated, and superheated prior to its entry into the lower pressure turbine. The superheated steam is routed through the reheat stop valve as it travels from the reheater to the lower pressure turbine. Energy conversion occurs again in the lower pressure turbine as the steam expands into the vacuum of the main condenser.

During a typical repair of the reheat steam valve, the reheat steam valve is weld repaired and then machined. Weld repairing is done to build up enough material to restore worn, damaged, or steam leak eroded surfaces. The reheat steam valve is then machined on a welded end surface on the interior of the valve body in order to achieve a surface that when mated with, or seated against, a corresponding piston surface, (the piston commonly called a clapper valve) an effective seal is produced.

Traditionally, this type of reheat steam valve repair has been difficult. Both the weld repairing and the machining are done within the reheat steam valve body where space is limited. A field technician working within the valve for either the weld repairing or the machining will find the working space cramped and difficult to maneuver. The current method of machining the interior end surface, or valve seat surface, within the reheat stop valve involves installing and aligning a boring bar to facilitate the current repair. The boring bar includes manual feed controls that can control the operations of cutting the valve seat face, valve radius, and valve throat. The boring bar is driven to rotate using hydraulics. A technician sits on a seat on top of the boring bar within the body of the reheat steam valve in order to operate the feed controls of the rotating tool. Operating a rotating tool in this manner, incurs risks of injury to the technician. Furthermore, installation of this equipment is difficult and has limitations in cutting force when cutting the valve seat radius. These force limitations may require an additional lapping process to sufficiently lap the valve seat radius to obtain a sufficient surface finish.

Consequently, a tool and process that would automate a restoration of the valve seating face such that it may be accomplished by a technician remotely while achieving a sufficient cut and finish is desired.

SUMMARY

Briefly described, aspects of the present disclosure relates to an automated method for restoring an end surface of a cylindrical component of a turbine engine by cutting a profile into the end surface and an automated system for cutting a profile into a surface of a cylindrical component of a turbine engine.

An automated method for restoring an end surface of a cylindrical component is provided. A base of a cutting device is installed against an inner diameter of the cylindrical component. The base is the aligned to the end surface. A cutting head of the cutting device is positioned to a desired position to enable the cutting. A motor of the cutting device is activated to rotate the cutting head about a central axis of the cylindrical component to cut the end surface of the cylindrical component. A profile of the end surface is created by the cutting of the end surface via the motor. Upon activation of the motor, the cutting device is guided along a circumferential direction against the end surface. A system for cutting a profile into a surface of a cylindrical component is also provided.

An automated system for cutting a profile into a surface of a cylindrical component of a turbine engine is also provided. The automated system includes a cutting device. The cutting system includes a base positioned against an inner diameter of the cylindrical component, a machining tool including a cutting head, and a motor configured to rotate the machining tool about a central axis of the cylindrical component. The machining tool is coupled to the base. The system also includes the cylindrical component. Upon activation of the motor, the cutting head is guided via the motor along a circumferential direction against the surface of the cylindrical component cutting a profile into the surface.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Furthermore, various operations may be described as multiple discrete steps performed in a manner that is helpful for understanding embodiments of the present invention. However, the order of description should not be construed as to imply that these operations need be performed in the order they are presented, nor that they are even order dependent unless otherwise so described.

An automated cutting device is now presented that may be used to precisely cut a profile into a seating surface of a cylindrical component while being operated remotely.

Figure 1:
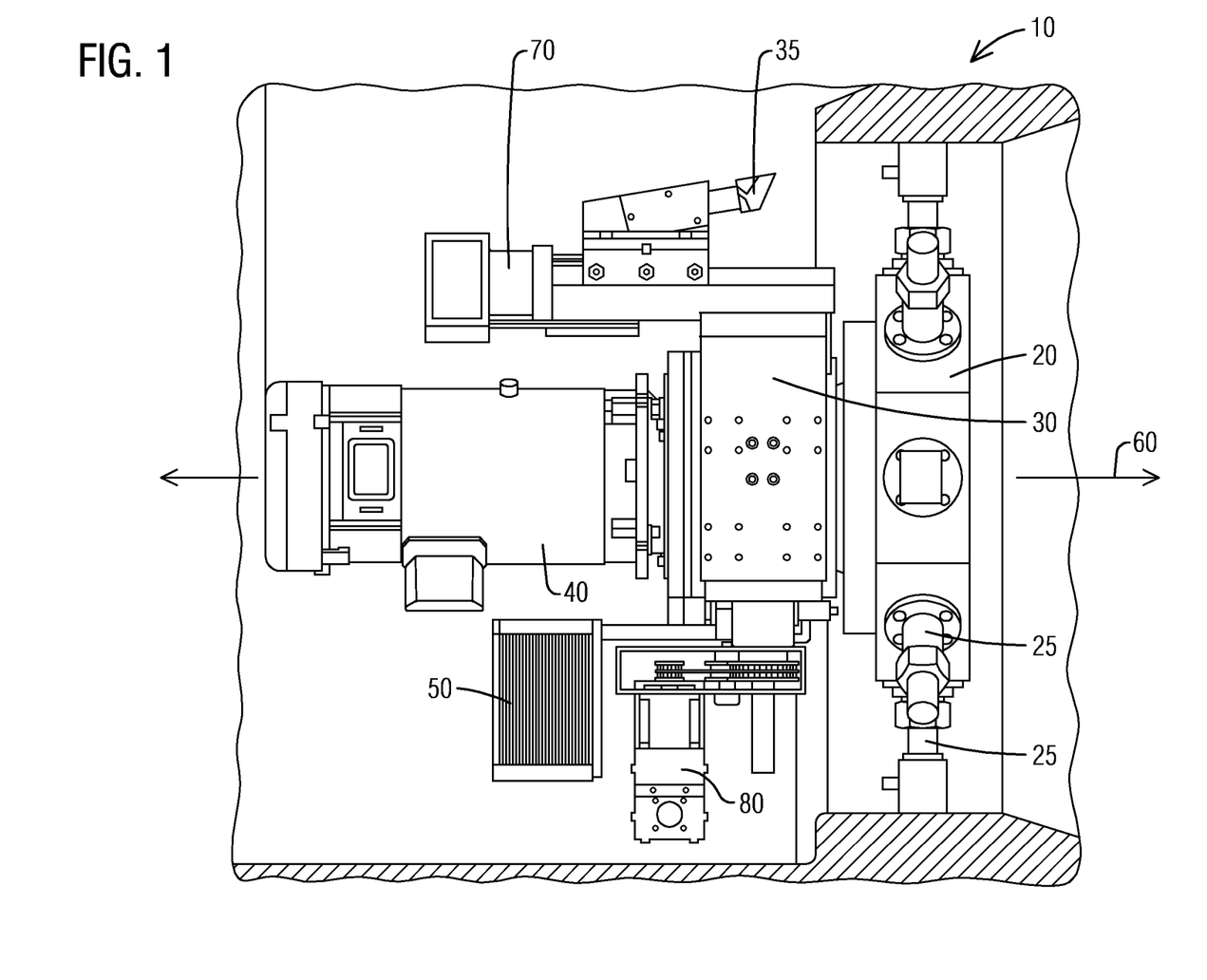
FIG. 1 illustrates a side view of a cutting device installed within a cylindrical turbine component.

Referring now to the figures where the showings are for purposes of illustrating embodiments of the subject matter herein only and not for limiting the same, FIG. 1 illustrates an embodiment of a side view of a cutting device 10 in accordance with an embodiment. The cutting device 10 includes a base 20, a machining tool 30, and a motor 40 for actuating the machining tool 30. The machining tool 30 is coupled to the base 20 and includes a cutting head 35. The motor 40 is operable to rotate the machining tool 30. For example, in an installed state within a cylindrical component, the cutting head 35 may be guided along a circumferential direction such that the cutting head 35 travels along an internal circumference of the cylindrical component. In one embodiment, the cylindrical element is a reheat stop valve and for illustrative purposes only, the cylindrical component will hereinafter be referred to as the reheat stop valve.

In accordance with an embodiment, the base 20 of the cutting device 10 may include a plurality of arms 25 extending out from a central portion. An end portion of each of the plurality of arms 25 may be configured to abut the inner diameter of the reheat stop valve such that the base 20 of the cutting device 10 is secured within the reheat stop valve.

Figure 2:
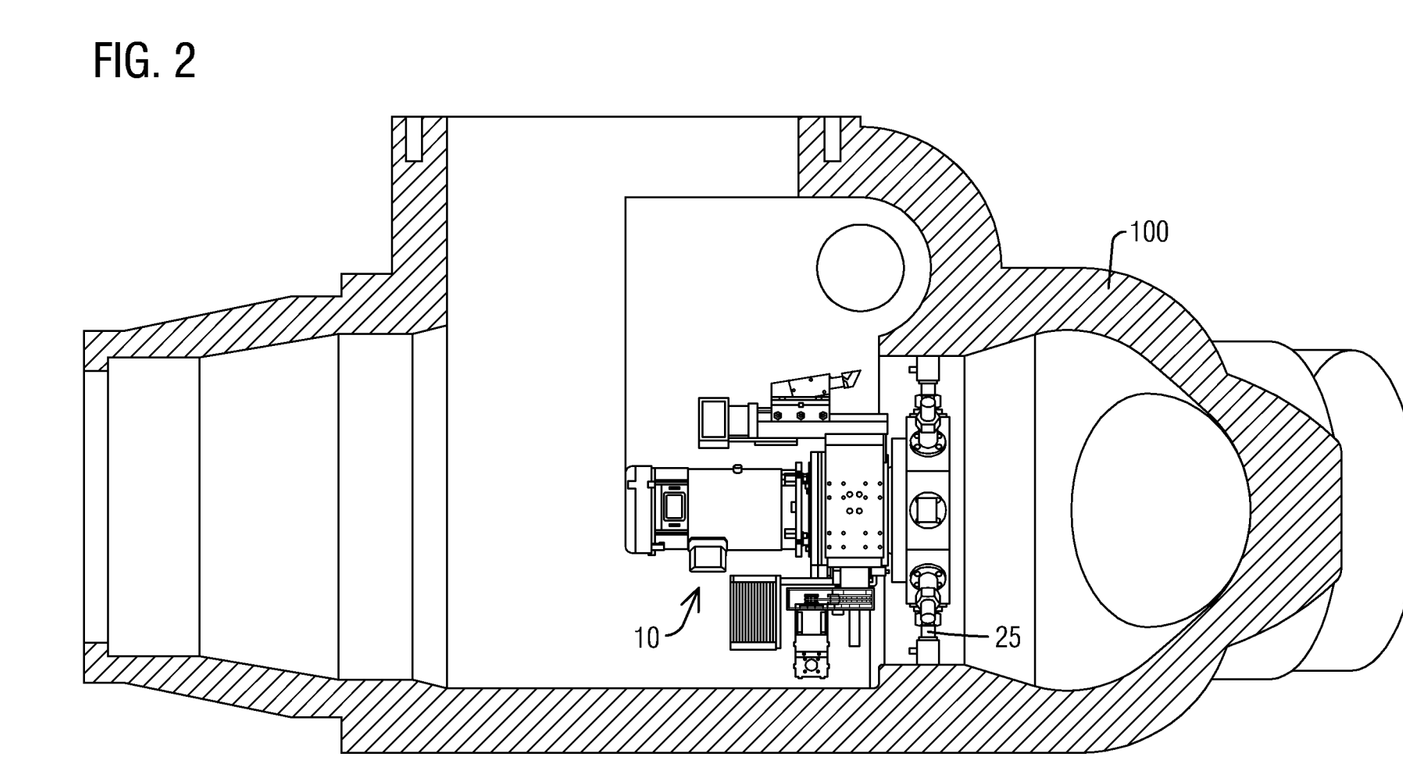
FIG. 2 illustrates a cross section of a reheat stop valve in which the cutting device is installed.

FIG. 2 illustrates a cross sectional view of the cutting device 10 installed within a reheat stop valve 100. The plurality of arms 25 extends out to the interior diameter of the reheat stop valve 100 such that the end portions of the arms 25 abut the interior diameter. Fasteners may be used to correctly align and secure the plurality of arms 25 to the interior surface of the reheat stop valve 100.

The cutting head 35 is effective to cut a metallic workpiece. The cutting head 35 may be embodied as a single point cutter. Additionally, the cutting head 35 may be designed to precisely cut a welded face of the reheat stop valve 100. As shown, a motor 40 is coupled to the machining tool 30 and may be configured to rotate the cutting head 35 about a central axis 60 of the reheat stop valve 100 in order to cut the welded face. The path traversed by the cutting head 35 which would be dictated by the desired geometry profile of the welded face may be controlled by a controller. An axial and radial stepper motor 70, 80 may be provided to position the cutting head 35 in the axial and radial positions, respectively.

The cutting device 10 may also include a controller 50 in operable communication with the motor 40 such that the controller 50 controls the motor 40. The controller 50 may be operated via a remote user interface so that a technician can operate the cutting device 10 from a remote location outside of the interior of the reheat stop valve 100, for example.

The controller 50 may include a processor. In the embodiment described, the processor is a small low cost computing device such as a Raspberry Pi device. The processor may be configured to carry out various processes and functions described herein by executing software instructions.

The controller 50 may include at least one input device, or user interface, and at least one display device in operative connection with the processor. The input device, for example, may include a hand held tablet easily used by a technician. The display device may include an LCD (liquid crystal display) display screen on the hand held tablet. The controller 50 may be operated remotely by a technician from the user interface via a wireless access point on the controller 50. The tablet may be automatically connected to the cutting device 10 via a web connection which resides on the cutting device 10 such that no outside Internet connection would be needed.

A system for cutting a surface of a cylindrical component, or a reheat stop valve 100 as presented in the described embodiment, includes the automated cutting device 10 as presented above, and the reheat stop valve 100. Upon activation of the motor 30, the cutting head 35 is guided via the motor 40 along a circumferential direction against a surface of the welded end surface of the reheat stop valve 100 cutting a profile into the surface.

Figure 3:
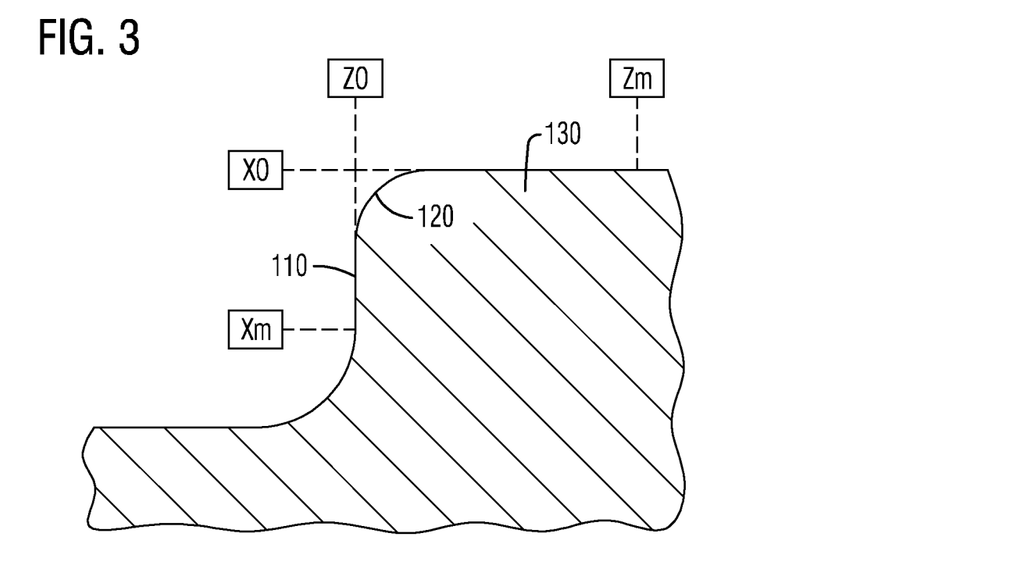
FIG. 3 illustrates an exploded view of an end surface of the reheat stop valve.

FIG. 3 illustrates an exploded cross sectional view of an interior end surface of the reheat stop valve 100 shown in FIG. 2. The geometry of the end surface includes a valve seat face 110, a curved portion also known as a valve radius 120, and valve throat 130. In order for the end surface to sufficiently mate to the clapper valve by forming a seal, the valve seat face 110, the valve radius 120, and the valve throat 130, may need to be restored to precise dimensions. For example, the valve radius 120 may be formed to a 0.50" radius. The valve extents, or dimensions, are also indicated on FIG. 3. For example, X0 and Xm indicate the Valve Throat stop position and the Radial Max position, respectively. Similarly, Z0 and Zm indicate Valve Face Stop position and the Axial Max position, respectively.

Figure 4:
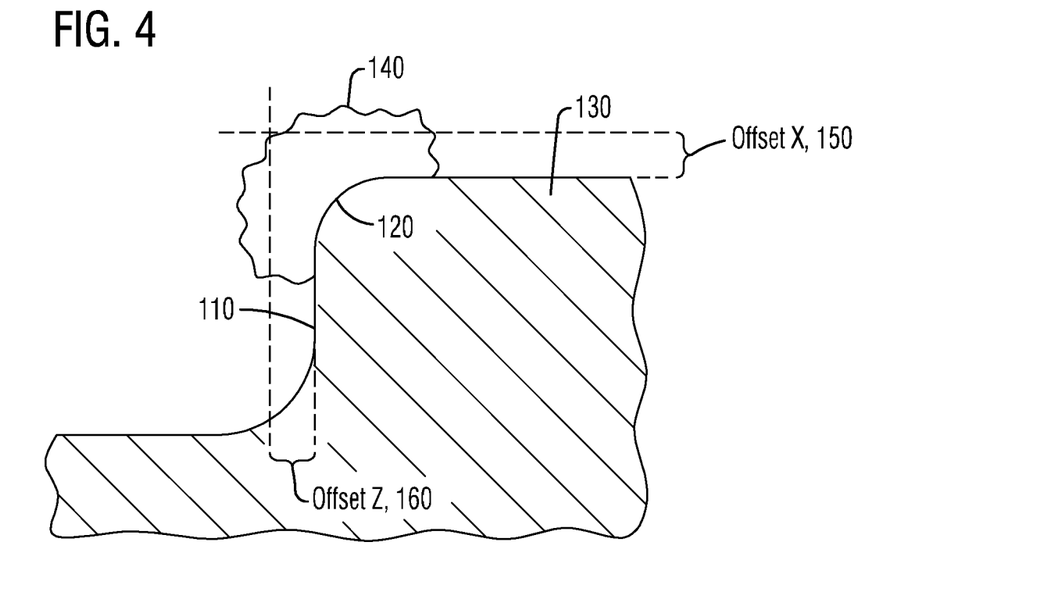
FIG. 4 illustrates an exploded view of a welded end surface of the reheat stop valve.

FIG. 4 illustrates the same exploded cross sectional view of the interior end surface of the reheat stop valve 100 as shown in FIG. 3, where the interior end surface has been welded. The weld material 140 is shown prior to a restoration process.

Figure 5:
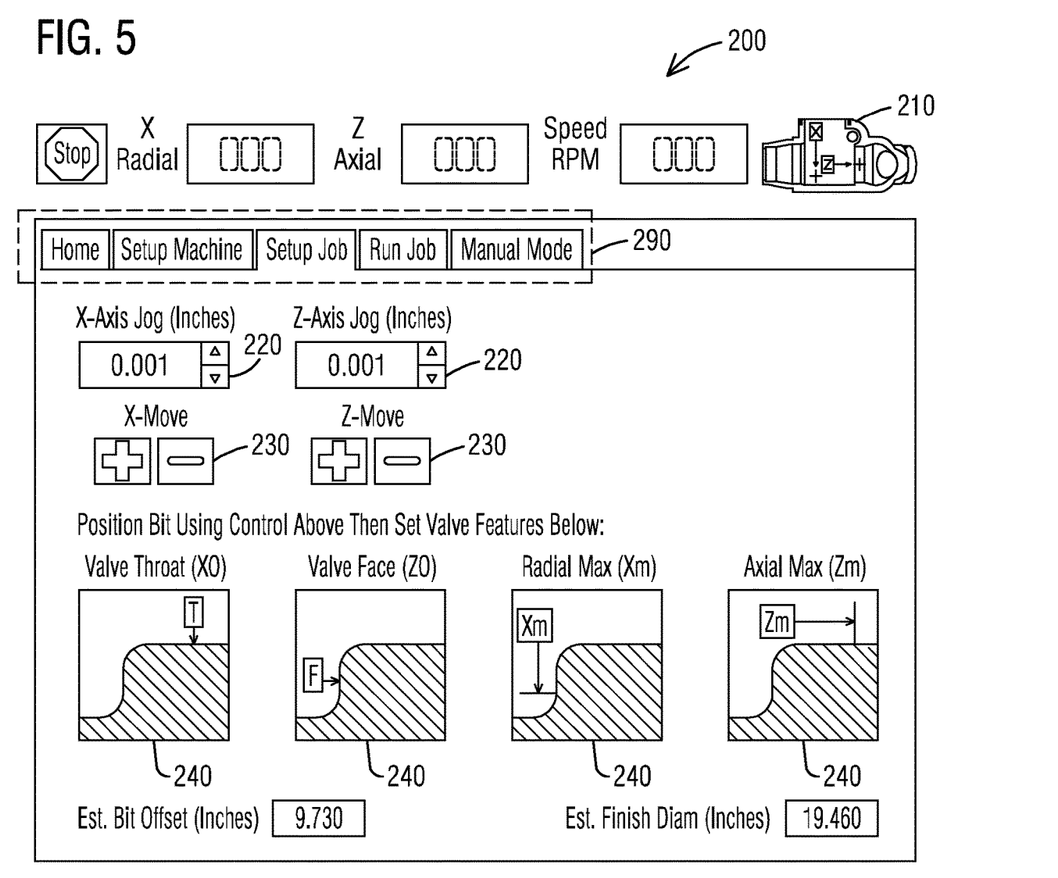
FIGS. 5-6 illustrate examples of user interfaces that facilitate control of the cutting device.
Figure 6:
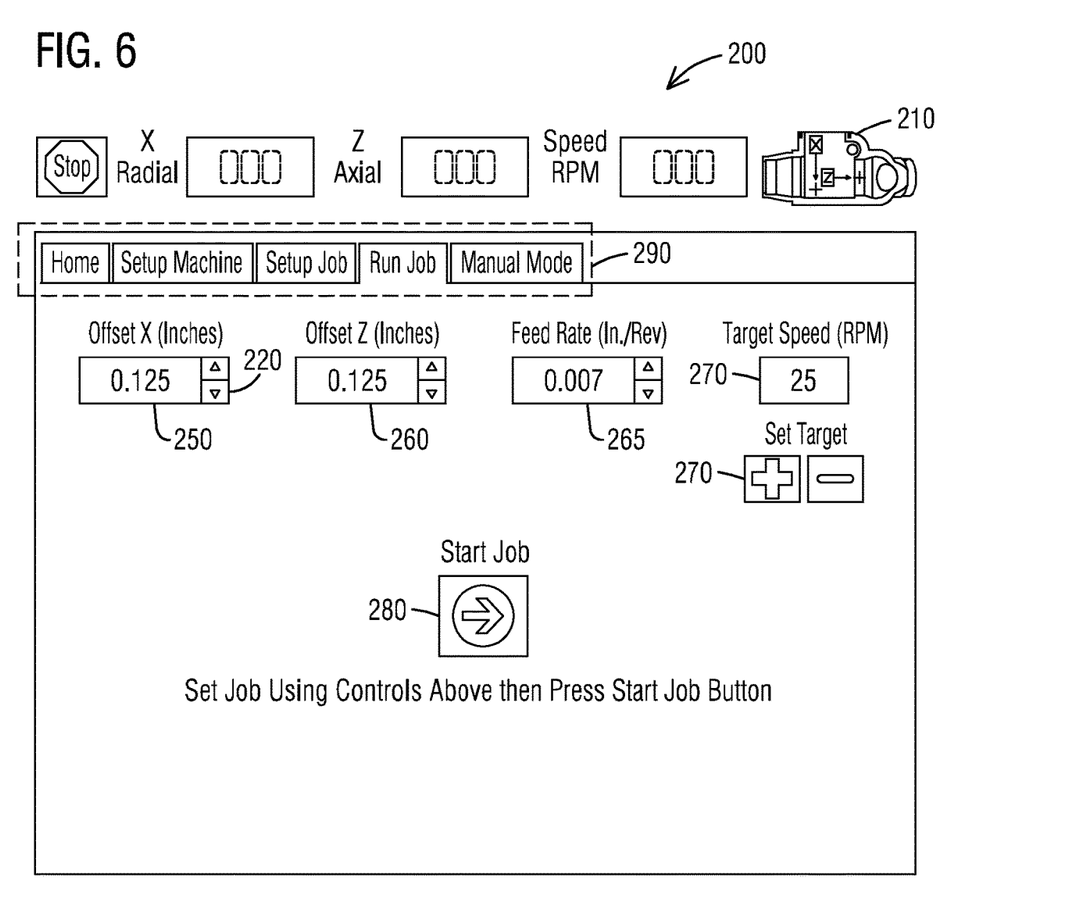

In order to enable a user to control the cutting device 10 via the controller 50, a user interface is provided. As described above, the user interface may include an input device and a display device. In the embodiment shown in FIGS. 5-6 of the user interface a tab bar (290) enables different sub-windows or tabs to be displayed that enable configurations of the cutting device 10 to be set up and activated. The SETUP JOB and the RUN JOB tabs are two of the shown tabs in this embodiment. An embodiment of the user interface 200 is illustrated in FIGS. 5-6 in which a SETUP JOB screen for the cutting device 10 is available to the user as well as a RUN JOB screen. The RUN JOB screen, as shown in FIG. 6, enables the user to activate the job set up by the user on the SETUP JOB screen, as shown in FIG. 5, such that the controller 50 activates the motor 40 to start the specified cutting job.

Upon initialization of the controller 50, the display device of the user interface 200 may present the user with a HOME Screen from which screen the user may select the tab, SETUP MACHINE, in order to setup the cutting device 10. From the SETUP MACHINE Screen, the user may enable the controller 50 to find and set a home position, go to a home position, or shutdown the automated device. The Home position is the minimum extent of travel for each axis of movement, the radial direction and the axial direction. Based on the extent of travel of the machining device 30 in both directions, the controller 50 calculates a Home position. Once the Home position is already set, the controller 50 may be able to move the cutting device 10 back to this home position while the cutting device 10 is setup and operational. In this described embodiment, the Home position is set up prior to setting up a cutting job. Once the Home position is set, the controller 50 reliably knows the location of the cutting head 35, and a job may be configured. The user may also be able to shut down the automated cutting device 10 from the SETUP MACHINE screen.

After the cutting device 10 is positioned in the Home position, a job may be setup by selecting the SETUP JOB tab. For example, FIG. 5 shows an embodiment of a user interface 200 in which a SETUP JOB screen is depicted. The visual display includes a symbol 210 representative of a reheat stop valve indicating the positive X-axis (radial) direction and the Z-axis (axial) directions. This valve symbol 210 may be seen in the upper right hand portion of the illustrated screen. Additionally, at the top of the SETUP JOB screen, the current radial (X radial) and axial (Z axial) positions as well as the Speed in RPM may be shown.

In the described embodiment, the user may move the cutting head position 35 using the X-axis Jog and Z-axis Jog 220. The cutting head 35 step adjustment, or Jog, may be input by by increasing or decreasing the position in thousandths of an inch by clicking the up arrow, to increase, and clicking the down arrow to decrease. The X-Move buttons 230 will actuate the X-axis jog input 220 and the Z-Move buttons 230 will actuate the Z-axis jog input 220 by selection of the +(increase direction) or −(decrease direction) buttons, respectively, such that the cutting head 35 moves the amount indicated by the inputs.

In addition to the features described in the previous paragraph, the user interface 200 may include symbols such that the user may set the valve features. Valve features may be set by selecting the icons, Valve Throat (X0) 240, Valve Face (Z0) 240, Radial Max (Xm) 240, and Axial Max (Zm) 240, respectively, on the SETUP JOB display screen in this described embodiment. For example, the Radial Max (Xm) 240 and Axial Max (Zm) 240 icons may be used to indicate the start of the valve seat face 110 and the end position of the valve throat 130, respectively. Additionally, the extent, or stop position, for cutting the valve throat 130 may be input using the Valve Throat (X0) icon 240 and the extent, or stop position, for cutting the valve seat face 110 may be input using the Valve Face (Z0) icon 240.

Once the user has moved the cutting head 35 to a desired position, depressing an icon 240, Valve Throat (X0), Valve Face (Z0), Radial Max (Xm), Axial Max (Zm), as described in the previous paragraph, instructs the controller 50 to record the current position of the cutting head 35 as the desired extent for the selected valve feature, Valve Throat, Valve Face, Radial Max, or Axial Max.

The user may then proceed to the RUN JOB screen as shown in FIG. 6 where Offset X (inches) 250 and/or Offset Z (inches) 260 may be input, as well as a Feed Rate 265 (in Inches/Revolution), and Target Speed (in RPM) 270. The X and Z Offsets 250, 260 and Feed Rate 265 may be entered by increasing or decreasing the position in thousandths of an inch and in inches per revolution, respectively, by clicking the up arrow, to increase, and clicking the down arrow to decrease. The X offset 250 for example denotes a distance from the valve throat 130 and the Z offset 260 denotes an offset from the valve seat face 110. As shown in FIG. 4, the weld material 140 may protrude a distance from the surface of the reheat stop valve 100. The X and Z offsets 150, 160 are used by the controller 50 to set the cutting head 35 a desired distance from the surface of the reheat stop valve 100. The Feed Rate 265 denotes how much material to take off in one revolution of the cutting device 10 in Inches/Revolution. The Target Speed 270, which may be set by clicking the up arrow to increase and clicking the down arrow to decrease, is the speed at which the cutting head 35 travels circumferentially in Revolutions/Minute. Once the user has input the desired parameters for the cutting job, the Start Job icon 280 may be depressed actuating the controller 50 to begin the cutting job.

In addition, the user interface 200 may include a MANUAL MODE Screen, selected by a tab on the JOB SETUP screen, that enables a user to operate the cutting device by setting the cutting head positions, the target speed, and the feed rate similarly to that described above. The manual mode of operation allows the user to set a feed direction as well as the feed rate. When the user initiates a cutting job in manual mode, the cutting device 10 will move the cutting head 35 in the feed direction at the indicated feed rate until either the user stops the cutting job or the maximum extent of travel in the feed direction is reached.

It should also be appreciated that the user interfaces shown in FIGS. 5-6 correspond to general outlines of a user interface in order to illustrate the features being described. Implementations of such user interfaces may include additional features that display additional information, menus, tabs, and or buttons that enable the users to control the cutting device 10.

Referring to FIGS. 1-6, a method for restoring an end surface of a cylindrical turbine component is proposed. The method entails cutting a profile into the end surface with an automated cutting device. In an embodiment, the end surface is a welded interior end surface of a reheat stop valve and the cylindrical component is the reheat stop valve 100, the geometry of the interior end surface is shown in FIG. 3.

The base 20 of a cutting device 10, as described above, is installed against an inner diameter of the reheat stop valve 100. The plurality of arms 25 of the base 20 extend out to the inner diameter of the reheat stop valve 100 such that the end portions of the plurality of arms 25 abut the inner diameter. Fasteners on the plurality of arms 25 may be used to secure the base 20 to the interior surface of the reheat stop valve 100. An alignment tool may be used to align the base 20 within the interior diameter of the reheat stop valve 100. The base 20 is also aligned to an end surface, or seating face, of the reheat stop valve 100 so that the cutting head 35 may cut the desired profile into the seating face. Once the base 20 is secured to the reheat stop valve 10 and aligned to the end surface, the machining tool 30 is attached to the base 20. A controller 50 operable to control the motor 40 may also be attached to the machining tool 30.

Once the cutting device 10 is installed and aligned, the machining tool 30 including the cutting head 35 may be set to a home position such that the controller 50 knows the position of the cutting head 35 in relation to the reheat stop valve 100. The cutting device is automatically positioned to the home position by the motor via the controller 50.

The rotational speed of the cutting device 10 may be adjusted prior to cutting the reheat steam valve 100 from the user interface 200. Typically, the rotational speed will typically lie in the range of 20 to 50 rotations per minute. The chosen rotational speed will depend on the type of material being cut, i.e. the weld material used, and the selected cutting head 35. The specific cutting heads are rated for cutting at specific linear speeds through materials with specific hardness so the rotational speed is typically set by the user so that the cutting head does not exceed this rating as it performs the cutting of the reheat stop valve. The motor 40 operates to rotate the machining tool 30 about the central axis 60 of the reheat stop valve 100, with reference to FIG. 1, which is controlled by the controller 50. Upon activation of the motor 40, the cutting head 35 is guided along a circumferential direction against the interior diameter of the reheat stop valve 100.

The feed rate of the cutting device 10 may be adjusted prior to cutting the reheat steam valve 100 from the user interface 200. The feed rate (in inches per revolution)

describes how much material may be taken off per revolution. Typically, the feed rate is in the range between 0.001 and 0.007 inches per revolution which is chosen based on the finish level desired, the weld material, and the particular cutting head 35 selected. A larger feed rate may produce a rougher finish while a smaller feed rate may produce a smoother more satin-like finish.

After the cutting device 10 is positioned in a home position and prior to cutting the end surface 110, 120, and 130, the cutting head 35 may be positioned to a desired position in order to enable cutting a profile into the end face 110, 120, 130 in the described embodiment. This may be accomplished by measuring a radial and/or axial distance between the cutting head and the welded end surface. Using the X-axis Jog input, Z-axis Jog input 250, as described previously, the user may input a desired axial and/or radial distance to move the cutting head. The cutting head 35 may then be moved to the desired position using the X-Move and Z-Move buttons 230, respectively, as described previously. The path extent for the cutting head may be set via the user interface 200 using the Valve Throat X0, Valve Face Z0, Radial Max Xm, and Axial Max Zm icons 240.

The user commences the cutting job by depressing the Start Job button 280 on the RUN JOB screen of the user interface 200. The activation of the motor 40 is performed via the controller 50. Upon activation of the motor 40, the cutting device 10 is guided along a circumferential direction against the end surface cutting the profile specified by the user through the user interface into the welded end surface 110, 120, 130 of the cylindrical component.

The disclosed automated method of restoring an end surface of the cylindrical component as well as the system for cutting a profile into an end surface of the cylindrical component of the turbine engine cuts the valve seat face, radius, and valve throat with a cutting head that is controlled by a processor. The method and system can precisely cut a welded end surface of the reheat stop valve so that the end surface has an acceptable surface finish eliminating the additional step of performing a lapping procedure in which an abrasive lapping compound is used to smooth out the end surface. Furthermore, the method and system removes the technician from operating cutting equipment from inside the reheat stop valve body. Thus, it may also be appreciated by one skilled in the art that in operation, the disclosed automated method and system provides an easy-to-use remote user interface through which a controller of the cutting device may be operated wirelessly. Lastly, by integrating a low cost processor such as a Raspberry Pi into the controller, the costs associated with system control are significantly decreased.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. An automated method for restoring an end surface of a cylindrical component of a turbine engine by cutting a profile into the end surface, comprising:
    installing a base of a cutting device against an inner diameter of a cylindrical component of the turbine engine so that the cutting device is entirely secured and supported by the base on the interior of the cylindrical component;
    aligning the base to the end surface of the cylindrical component;
    positioning a cutting head of the cutting device to a desired position to enable the cutting of the profile by moving the cutting head via a controller a radial and/or an axial distance to the desired location and setting a path extent including an axial distance and a radial distance using the desired location for the cutting head from a graphical user interface;
    activating a motor of the cutting device to rotate the cutting head about a central axis of the cylindrical component to cut the end surface of the cylindrical component;
    creating a profile of the end face by the cutting of the end surface via the motor,
    controlling the motor by a controller of the cutting device, the controller including a processor;
    generating the graphical user interface through a display device allowing a user to visually select and input control parameters for the cutting device;
    receiving inputs from the user through the graphical user interface corresponding to the input control parameters,
    wherein upon activation of the motor, the cutting device is guided along a circumferential direction against the end surface,
    wherein the cutting device is entirely disposed within the interior of the cylindrical component, and
    wherein the controller is configured to control the cutting head via the processor based at least in part on the inputs received through the graphical user interface so that the cutting head is guided by the motor to precisely cut a contoured profile into the end surface described by the path extent utilizing the same cutting head.

2. The method as claimed in claim 1, wherein the base comprises plurality of arms extending out from a central portion, and
    wherein the installing includes disposing an end portion of each of the plurality of arms to abut the inner diameter, and
    wherein the installing includes securing the plurality of arms to the inner diameter.

3. The method as claimed in claim 1, wherein the control parameters are selected from the group consisting of valve features, cutting head positions, feed rate and target speed.

4. The method as claimed in claim 1, wherein the controller is operated wirelessly via the graphical user interface.

5. The method as claimed in claim 1, wherein the positioning includes locating the cutting device to a home position driven by the motor via the controller, wherein the locating occurs prior to creating the profile.

6. The method as claimed in claim 1, the positioning further comprising measuring a radial or an axial distance between the cutting head and the end surface.

7. The method as claimed in claim 1, further comprising adjusting the rotational speed of the graphical cutting device from the user interface.

8. The method as claimed in claim 1, further comprising adjusting the feed rate from the graphical user interface.

9. The method as claimed in claim 1, wherein the cylindrical element is a reheat stop valve of a gas turbine engine, and wherein the profile includes a valve seat face, a valve radius, and a valve throat surface of the reheat stop valve of the turbine engine.

* * * * *